United States Patent
Amaya et al.

(10) Patent No.: US 8,052,588 B2
(45) Date of Patent: Nov. 8, 2011

(54) TOOL REPLACEMENT SYSTEM

(75) Inventors: Kouichi Amaya, Fukui (JP); Hiroyuki Yamaguchi, Fukui (JP); Hiroshi Arakawa, Fukui (JP); Tomohiro Shintani, Fukui (JP)

(73) Assignee: Matsuura Machinery Corporation, Fukui-shi, Fukui (JP)

( * ) Notice: Subject to any disclaimer, the term of this patent is extended or adjusted under 35 U.S.C. 154(b) by 586 days.

(21) Appl. No.: 12/267,601

(22) Filed: Nov. 9, 2008

(65) Prior Publication Data

US 2010/0004107 A1    Jan. 7, 2010

(30) Foreign Application Priority Data

Jul. 1, 2008   (JP) .................................. 2008-171919

(51) Int. Cl.
B23Q 3/157  (2006.01)
(52) U.S. Cl. .................. 483/4; 483/37; 483/52; 483/63; 700/179
(58) Field of Classification Search .................. 483/1, 4, 483/5, 6, 7–11, 37, 52, 63, 64; 700/179
See application file for complete search history.

(56) References Cited

U.S. PATENT DOCUMENTS

| 4,780,952 A | * | 11/1988 | Babel et al. | 483/64 |
| 4,866,835 A | * | 9/1989 | Novak | 483/63 |
| 4,920,632 A | * | 5/1990 | Babel | 483/64 |
| 2007/0184954 A1 | * | 8/2007 | Muser | 483/1 |

FOREIGN PATENT DOCUMENTS

JP    8-187640 A    7/1996

OTHER PUBLICATIONS

Machine Translation of JP 8-187640, which JP '640 was published Jul. 1996.*

* cited by examiner

*Primary Examiner* — Erica E Cadugan
(74) *Attorney, Agent, or Firm* — Richard M. Goldberg

(57) ABSTRACT

The present invention has an object to provide a tool replacement system that is capable of preventing the waiting time from occurring as much as possible although an intermediate magazine arranged therefore has a smaller capacity than prior arts. In the tool replacement system, programs pertaining to the sequence of operation and operation time of operating tools 7 are established, wherein, when the operation time of individual tools 7 is shorter than the conveyance time for reciprocation of the tool conveyance apparatus 3 between the tool magazine 1 and the tool replacement arm 4, the object can be solved by realizing transfer of at least a part of the tools planned to be operated in a next process of the corresponding individual tools 7 to the tool replacement arm 4 after the tools are arranged to the intermediate magazine 5.

7 Claims, 6 Drawing Sheets

* "a" denotes the moving time required for reciprocation of the tool conveyance apparatus between the tool magazine and the tool replacement arm, and such a denotation is applied to respective flowcharts of Figs. 3, 4, and 5.
** "i" denotes the total number of tools planned to operate, and such a denotation is applied to respective flowcharts of Figs. 3, 4, 5 and 6.

Fig. 4

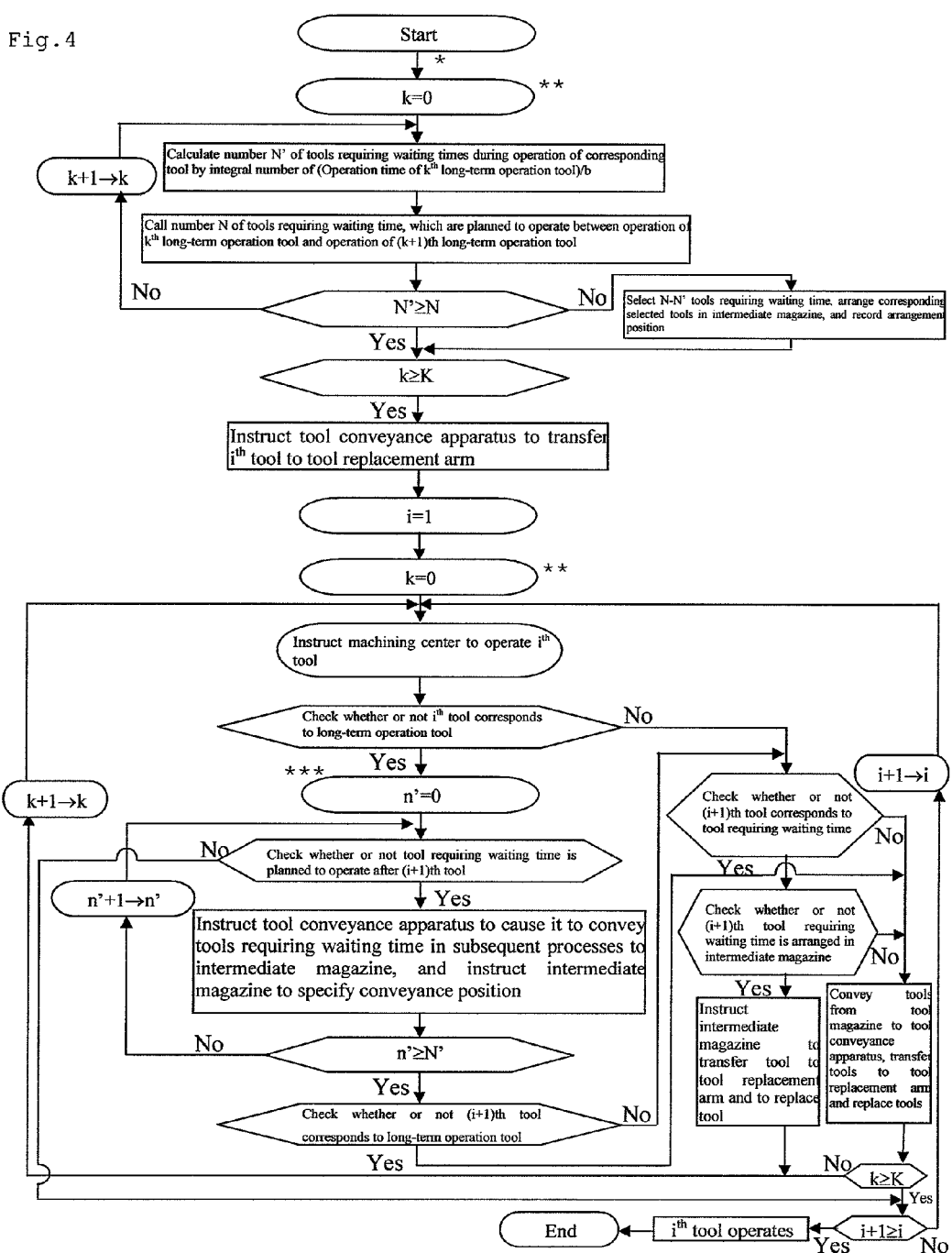

* Although the processes from START to the judgment of (i+1)≥i of the top half in the flowchart of Fig. 3 are carried out, illustration of the corresponding processes is omitted due to restriction in the spacing, and this point is applied to Fig. 5.
** "k" shows the sequence of the long-term operation tools, and "K" shows the total number of the long-term operation tools. Taking into consideration a case where the total number of the corresponding tools is zero, the default figure is set to 0, and this point is applied the flowchart of Fig. 5.
*** Since "n'," which is the number by which the tools requiring waiting time can be arranged in the intermediate magazine during operation of the long-term operation tool planned at the $k^{th}$ time, is sequentially counted, the default figure before counting is set to 0, and N' shows the total number by which the tools requiring waiting time can be arranged in the intermediate magazine during operation of the long-term operation tool planned at the $k^{th}$ time. This point is applied to the flowchart of Fig. 5.

* The flowcharts of Figs. 2, 3, 4 and 5 show the process of transferring the (i+1)th tool to the tool replacement arm and replacing the same. However, illustration of the corresponding tool is omitted due to restriction in the spacing.

TOOL REPLACEMENT SYSTEM

TECHNICAL FIELD

The present invention relates to a tool replacement system that is capable of realizing transfer and conveyance of tools to a machining center and take-out and return of tools from the machining center by means of a tool conveyance apparatus, an intermediate magazine and a tool replacement arm, which are located between a tool magazine for accommodating and holding tools and the machining center in which a tool is operated by rotation of the main spindle.

BACKGROUND ART

In a prior art tool replacement system, a tool replacement arm that copes with carry-in and carry-out of tools is provided at a machining center side, a tool conveyance apparatus reciprocates between the tool magazine and the tool replacement arm while holding a tool, and realizes acceptance of a tool from the tool replacement arm.

However, instead of directly accepting a tool between the tool conveyance apparatus and the tool replacement arm, such a design example exists, in which an intermediate holding portion is provided at a position within the range of turning of the holding portion at both side end portions of the tool replacement arm, and a tool is carried in the machining center by transferring the tool to the end portion side of the tool replacement arm while temporarily holding the tool transferred from the tool conveyance apparatus, and conversely, return of the corresponding tool is completed by transferring the tool to the tool conveyance apparatus after the tool replacement arm accepts the tool carried out from the machining center.

In this connection, it takes a predetermined duration of time for the tool conveyance apparatus to convey a tool from the tool magazine to the tool replacement arm and to return the tool, which is separated from the tool replacement apparatus, to the tool magazine.

However, operation times required for tools in a machining center are diverse, a case where the operation time is shorter than the time required for the tool conveyance apparatus to convey the tool to the intermediate holding apparatus occurs.

In such a case, with a tool intended to be operated next after the tool requiring such a shorter operation time, since the operation of the tool requiring a shorter operation time already ends at the point of time when the next tool is transferred to the position of the tool replacement arm by the tool conveyance apparatus, a so-called waiting time may occur in the machining center until the machining center commences its own operation.

As a matter of course, where such a waiting time frequently occurs, the operation efficiency in the entire process is necessarily lowered.

Taking attention on such a shortcoming in the prior art tool replacement system, such a configuration is disclosed in Patent Document 1, in which an intermediate magazine, for holding a plurality of tools sequentially between a tool arm, which is capable of replacing tools, is installed between the tool magazine and the machining center, the tool conveyance apparatus transfers tools from the intermediate magazine to the tool replacement arm and the corresponding intermediate magazine accepts tools from the tool replacement arm while the tool conveyance apparatus accepts tools from the intermediate magazine while reciprocating between the intermediate magazine and the tool magazine.

In the configuration according to Patent Document 1, since, with respect to all tools, transfer and carry-in of tools into the machining center and carry-out and return of the tools from the machining center are realized based on replacement between the intermediate magazine and the tool replacement arm, and all the tools planned to be operated are held in the intermediate magazine, no waiting time occurs, and efficient tool operation can be realized.

However, in the above-described configuration, the intermediate magazine is required to hold even tools, for which no waiting time occurs in order to hold, since all the tools are held in the intermediate magazine. As a result, the number of tools that the intermediate magazine must hold is necessarily increased, and it is necessary that the intermediate magazine has a large space therefore.

However, the arrangement situation of the machining center and tool magazine does not necessarily allow a large space for the intermediate magazine.

Patent Document 1 Japanese Published number of Unexamined Patent Application Hei-08-187640

DISCLOSURE OF THE INVENTION AND OBJECTS TO BE SOLVED BY THE INVENTION

The present invention has an object to provide a configuration of a tool replacement system which is capable of preventing waiting time from occurring as much as possible when carrying in tools although the arrangement of the intermediate magazine is clearly of small capacity in comparison with a case of an intermediate magazine of holding all the tools planned to be operated.

In order to solve the above object, the basic configuration of the present invention is a tool replacement system including: a tool conveyance apparatus for holding tools and conveying the tools between a tool magazine storing plurality of tools accommodated therein and a machining center in which tools are operated by rotations of the main spindle;

a tool replacement arm for accepting tools by rotational movement and carrying the tools in a machining center, and taking out tools, whose operations have already ended, from the machining center; and an intermediate magazine for accepting tools between the tool conveyance apparatus and the tool replacement arm, wherein;

a computer for controlling the system establishes programs regarding sequences of operations and operation time of tools operating in all the processes in advance, and, where tools, planned to be operated next after a specified tool, for which the operation time is shorter than the conveyance time by reciprocation of the tool conveyance apparatus between the tool magazine and the tool replacement arm, are transferred to the tool replacement arm by the tool conveyance apparatus, a least a part of the tools( hereinafter called a "tools requiring waiting time" in plural case, or "tool requiring waiting time" in simple case), planned to be operated next, for which waiting time occurs until the operation since the operation of the specified tool already had ended is conveyed to the intermediate magazine in advance by an instruction of the computer in the machining center, and, in the intermediate magazine, the corresponding tools requiring waiting time can be transferred, with the arrangement of line by the sequence of operation, to the tool replacement arm via the intermediate magazine.

Figure 2:
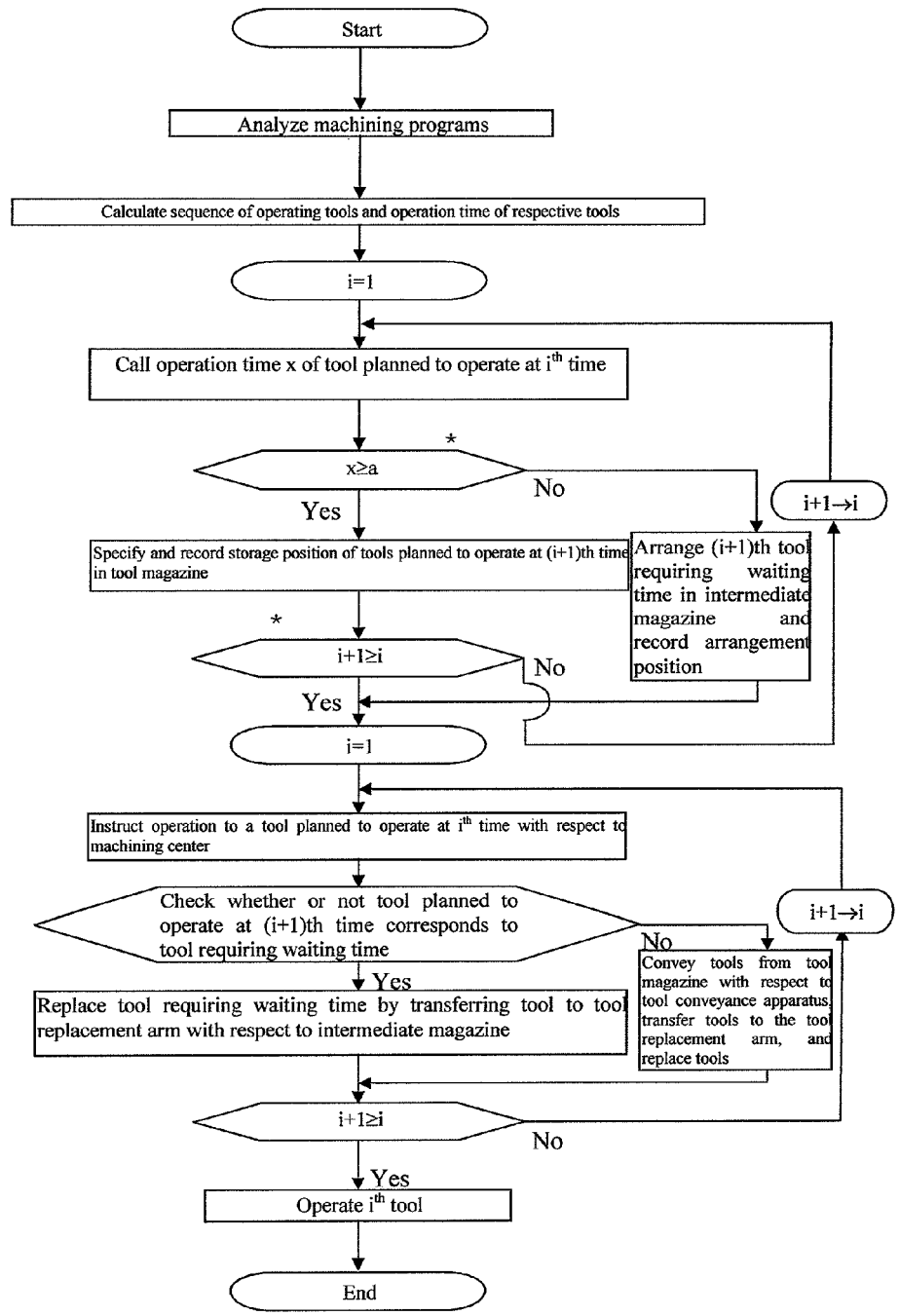
Figure 3:
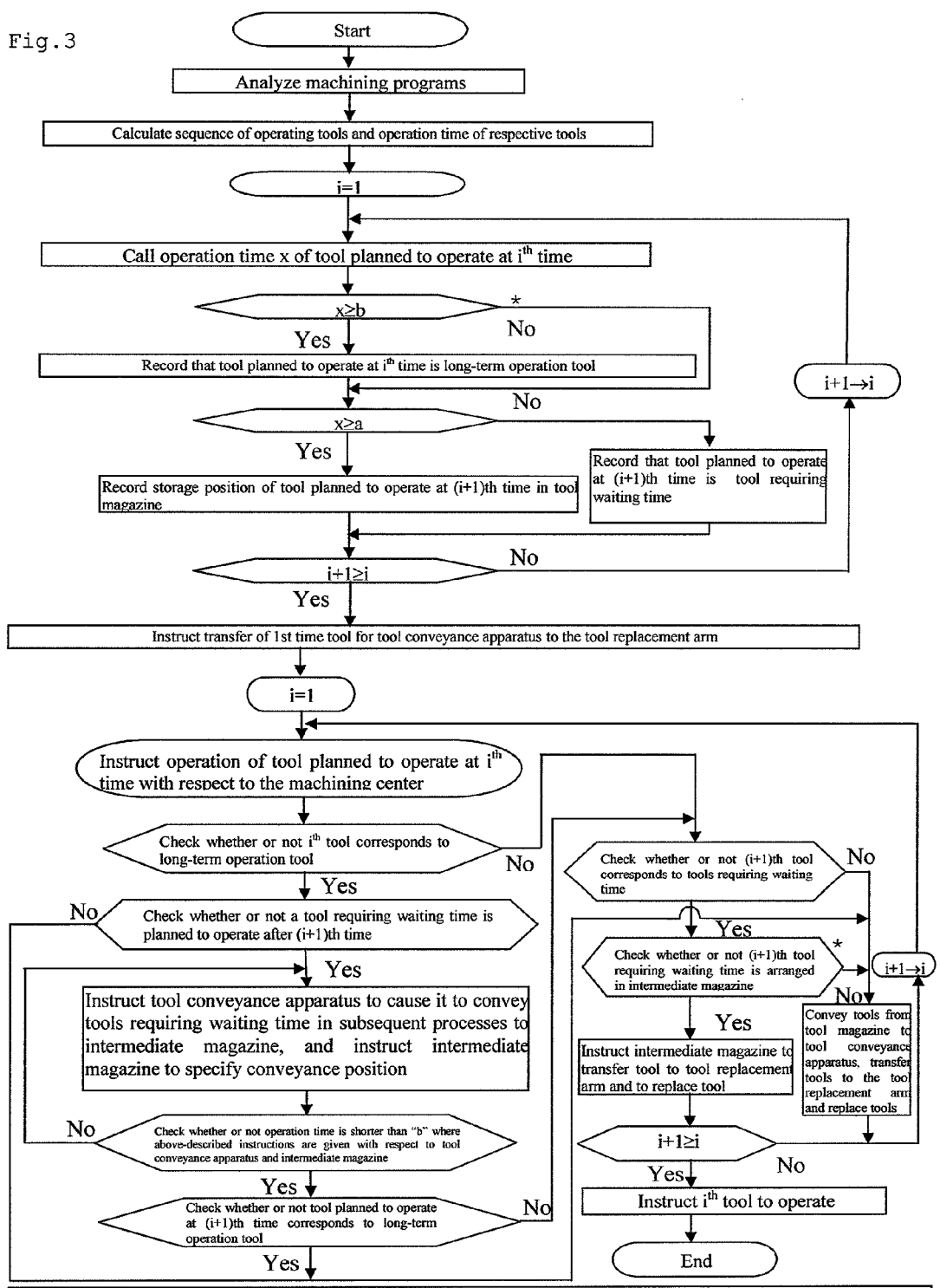
Figure 5:
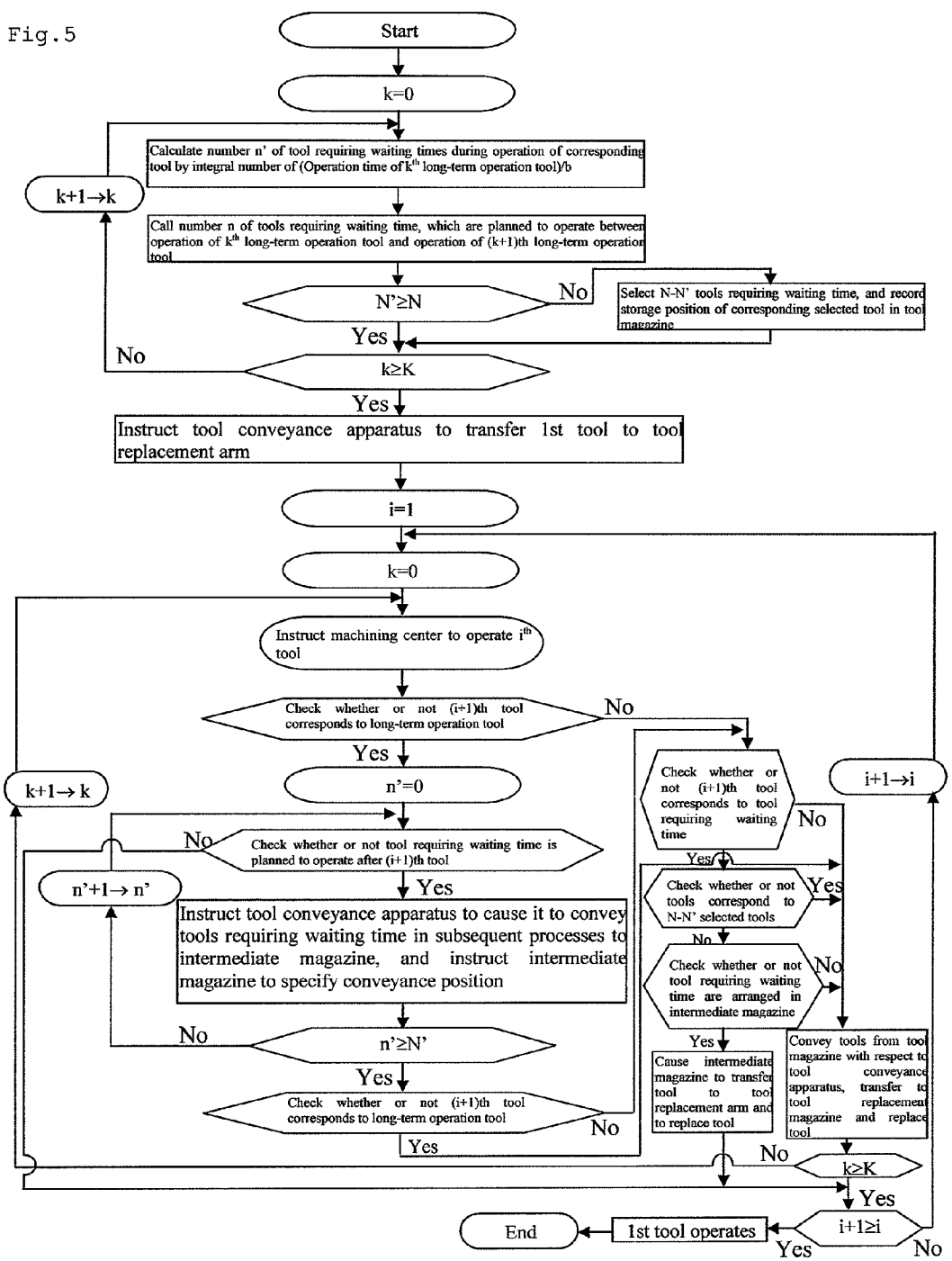
Figure 6:
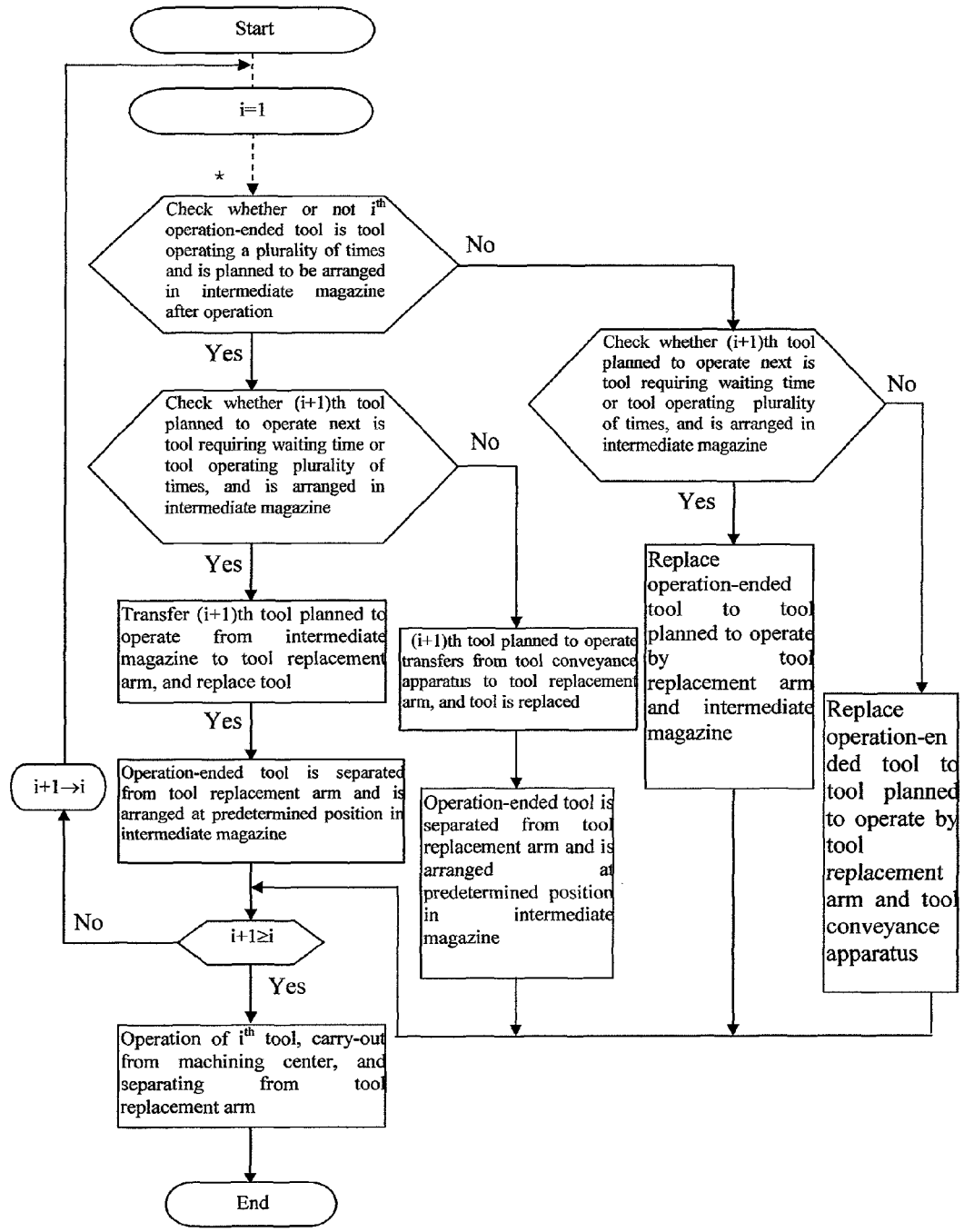

shows a case where a tool is being replaced between a tool conveyance apparatus and a tool replacement arm, and FIG. 1 (b) shows a case where after the tool is once arranged in an intermediate magazine replacement is carried out for the tool between the corresponding intermediate magazine and the tool replacement arm;

FIG. 2 is a flowchart showing an operation process according to an embodiment before operation;

FIG. 3 is a flowchart showing an operation process according to an embodiment during operation;

FIG. 4 is a flowchart showing a sequence of operation of an embodiment in which a part of the tools requiring waiting time, which cannot be arranged in the intermediate magazine, is arranged in the intermediate magazine in advance prior to the corresponding operation in the stage of operation of a machining center;

FIG. 5 is a flowchart showing an sequence of operation of an embodiment in which a part of the tools requiring waiting time, which cannot be arranged in the intermediate magazine, can be replaced directly between the machining center and the tool replacement arm via the tool conveyance apparatus without the intermediate magazine during the corresponding operation in the stage of operation of a machining center;

FIG. 6 is a flowchart showing an operation process of example.

DESCRIPTION OF REFERENCE NUMERALS

1 Tool magazine
2 Machining center
3 Tool conveyance apparatus
4 Tool replacement arm
5 Intermediate magazine
6 Rotational main spindle
7 Tool
8 Central controlling unit by computer

BEST MODE FOR CARRYING OUT THE INVENTION

Figure 1A:
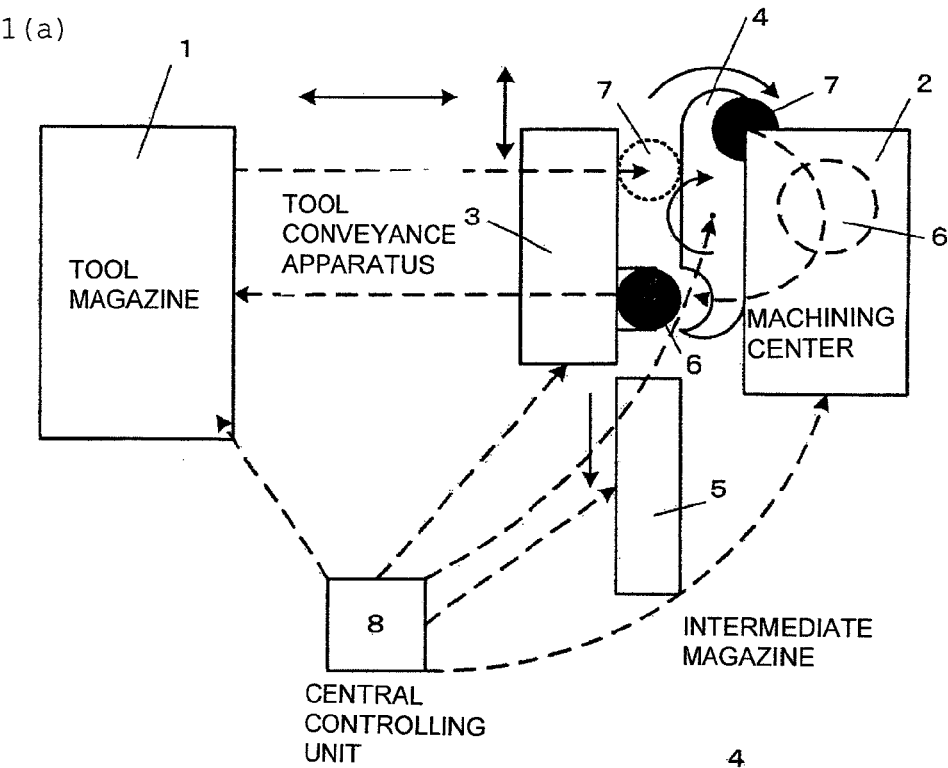
FIG. 1 is an entire configuration view showing the basic configuration of the present invention, wherein FIG. 1 (a)

As shown in FIGS. 1(a) and (b), in the basic configuration according to the present invention, a tool conveyance apparatus 3, an intermediate magazine 5 and a tool replacement arm 4 are arranged between a tool magazine 1 and a machining center 2 (The solid line arrows show a tool 7 movable by the tool conveyance apparatus 3 and the intermediate magazine 5 and the rotational direction of the tool replacement arm 4, and the dotted line arrows show the movement direction of the tool 7 and the transmission direction of the instruction of the central control unit 8 by a computer).

Figure 1B:
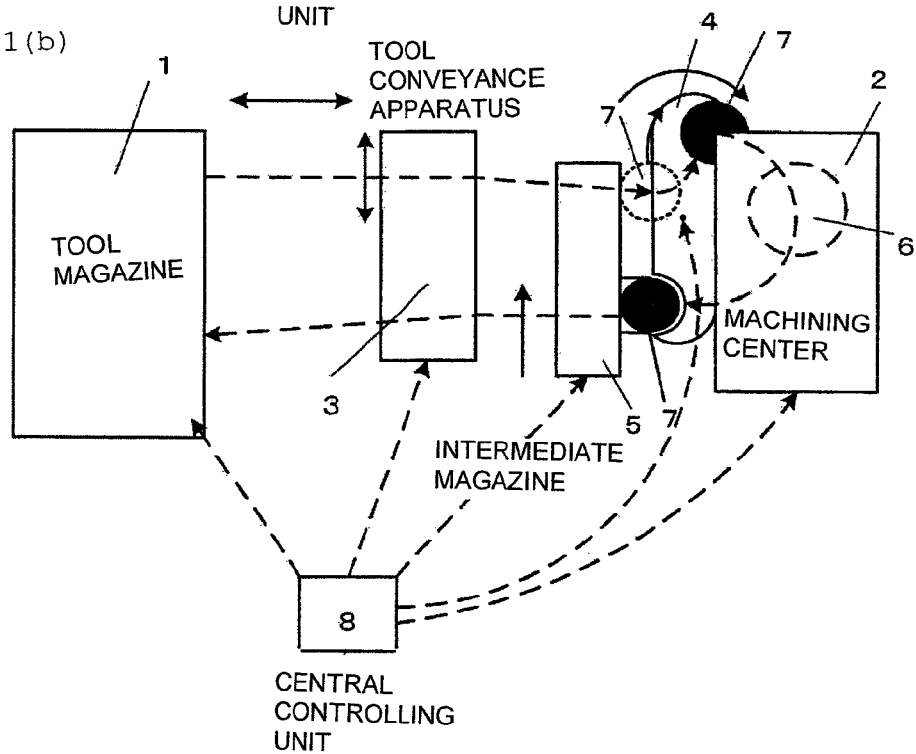

FIG. 1(a) shows a case where a tool 7 is accepted between the tool conveyance apparatus 3 and the tool replacement arm 4, and FIG. 1(b) shows a case where the tool 7 is accepted between the intermediate magazine 5 and the tool replacement arm 4. However, as shown in FIG. 1(a), where the tool conveyance apparatus 3 accepts the tool 7 from the tool replacement arm 4, it is essential that the intermediate magazine 5 is moved from the position, at which the intermediate magazine 5 accepts the tool 7 from the tool replacement arm 4, for the object that intermediate magazine 5 may avoid to obstruct for the corresponding acceptance (the intermediate magazine 5 is different in this point from the intermediate magazine 5 according to Patent Document 1).

By the way, in FIGS. 1(a) and (b), the intermediate magazine 5 adopts a roughly pillar-like (roughly straight line-like) shape by which tools 7 are arrayed in one line. However, the intermediate magazine 5 according to the present invention is not limited thereto, wherein it is a matter of course that a circle-shaped intermediate magazine 5 by which arraying along the circumferential direction is enabled as in, for example, Patent Document 1 may be adopted.

By the way, in the present invention, it is essential that a tool 7 for which operation ends is taken out from the machining center 2, and is separated from the tool replacement arm 4.

In such a case, such an embodiment will be adopted in most cases in regard to the basic configuration, wherein when a tool 7 requiring waiting time is transferred from the intermediate magazine 5 to the tool replacement arm 4, a tool 7 whose operation has already ended is separated from the tool replacement arm 4 and is accepted by the intermediate magazine 5.

In the above-described embodiment, acceptance of the tool 7 is simultaneously realized between the intermediate magazine 5 and the tool replacement arm 4, and it is possible to efficiently realize conveyance and transfer of tool 7 to the machining center 2 and take-out and return thereof from the machining center 2.

In the above-described embodiment, if a tool 7 carried in the machining center 2 is a tool requiring waiting time even in a case where the tool 7 taken out from the machining center 2 does not correspond to the tool 7 requiring waiting time, the tool 7 is necessarily returned to the tool magazine 1 via the intermediate magazine 5.

However, it is not necessary that, with respect to the respective tools 7, the process of moving from the tool magazine 1 to the machining center 2 and the process of returning from the machining center 2 to the tool magazine 1 are identical to each other whether or not via the intermediate magazine 5.

That is, with respect to the tool 7 requiring waiting time, an action and an effect of efficient replacement of tool 7 can be realized by transfer and carry-in of tools 7 into the machining center 2 via an intermediate magazine and, since there exist no obstruction for working above-described action and effect even if the carry-out of tool 7 from the machining center 2 and separation of the tool 7 from the tool replacement arm 4 are carried out between the machining center 2 and the intermediate magazine 5 and the corresponding separated tool 7 is temporarily held in the intermediate magazine 5, the above-described embodiment has substantially sufficient technical rationality.

The above-described basic configuration is roughly classified into an embodiment (before-operation embodiment) in which a tool 7 requiring waiting time is arranged in the intermediate magazine 5 based on selection of the basic configuration before the stage of operation in the machining center 2, and an embodiment (during-operation embodiment) in which a tool 7 requiring waiting time is arranged in the intermediate magazine 5 during the stage of operation in the machining center 2.

The configuration of the before-operation embodiment is featured in that tools 7 requiring waiting time are arranged in advance in the intermediate magazine 5 of line by the sequence of procedure at the stage before commencing operation in the machining center 2.

A detailed example regarding the operation of the before-operation embodiment is as shown in the flowchart of FIG. 2 (Also, the flowchart of FIG. 2 shows the process until all the tools 7 begin to operate, wherein the process of carry-out of the tools 7, for which the operation has ended, from the machining center 2 and return thereof to the tool magazine 1 is omitted).

As has been made clear in the flowchart of FIG. 2, by arranging the tool 7 requiring waiting time in the intermediate magazine 5 in line with the sequence of operation in advance in the stage before operation in the machining center 2, it is possible to realize efficient operation of the tools 7 while avoiding occurrence of such waiting time as in the prior art.

However, in the case of the before-operation embodiment, since a predetermined tool 7 is arranged with respect to the intermediate magazine 5 in the stage before operation in the machining center 2, such a shortcoming as the production process not being immediately commenced with the tool 7 cannot be avoided.

The during-operation embodiment can overcome the above-described shortcoming. The configuration thereof is featured in that, a tool 7 operating for the first time is transferred from the tool conveyance apparatus 3 to the tool replacement arm 4, tools 7 requiring waiting time are arranged sequentially in the intermediate magazine 5 of line by the sequence of operation by the tool conveyance apparatus 3 at the stage in which a tool 7 (hereinafter called: long-term operation "tool") plurality of tools 7 thereafter operating sequentially, with operation time of exceeding the total sum brought by adding the time in which the tool conveyance apparatus 3 reaches the tool magazine 1 from the tool replacement arm 4 and further transfers to the intermediate magazine 5 to the time of arranging thereof in the intermediate magazine 5, is operating.

A detailed example regarding the operation of the during-operation embodiment is as shown in the flowchart of FIG. 3 (Also, in the flowchart of FIG. 3, the process of carry-out of the operation-ended tools 7 from the machining center 2 and return thereof to the tool magazine 1 is omitted, and the above-described point is the same as in the cases of FIG. 4 and FIG. 5).

As has been made clear in the flowchart of FIG. 3, in the case of the during-operation embodiment, the tools 7 requiring waiting time are not arranged in the intermediate magazine 5 before operation in the machining center 2, and the tools 7 requiring waiting time are arranged in the intermediate magazine 5 sequentially during operation of the long-term operation tool 7. After that, the tools 7 requiring waiting time are transferred from the intermediate magazine 5 to the tool replacement arm 4, whereby respective operations are made possible without accompanying the waiting time, and the operation efficiency can be further improved.

However, an inherent technical problem exists in the during-operation embodiment.

Describing in detail, in the case of assuming that the operation time of the long-term operation tool 7 is "B," and the total sum brought by adding the time required for the tool conveyance apparatus 3 to return from the tool replacement arm 4 to the tool magazine 1 and further to transfer to the intermediate magazine 5 to the time required for the tool to be arranged in the intermediate magazine 5 is "b,"

$B/b \geq N'$ (wherein $N'$ is an integral number of 1 or more), the number by subsequently planned tools 7 requiring waiting time can be arranged in the intermediate magazine 5 is N'.

However, in the case of assuming that the number of tools 7 requiring waiting time, which are planned to be operated in the machining center 2 between a specified long-term operation tool 7 and a long-term operation tool 7 operating next is N, the relationship is not limited to N' N. That is, a case in which N>N' is established may exist. In this case, it is not possible that all of planned "N" tools 7 requiring waiting time are arranged in the intermediate magazine 5, with respect to (N-N') tools 7 requiring waiting time, it becomes impossible that these tools are arranged in the intermediate magazine 5 during operation of the long-term operation tools 7.

In order to solve such a technical problem, such an embodiment may be adopted, which is featured in that where the number of tools 7 requiring waiting time that can be conveyed to the intermediate magazine 5 and can be arranged in the intermediate magazine 5 within the time in which a specified long-term operation tool 7 is operating is smaller than the number of tools 7 requiring waiting time, which are planned to be operated, from the time when the corresponding long-term operation tool 7 has operated to the time when the next long-term operation tool 7 is operated, the tools 7 requiring waiting time, which are found in advance that the tools 7 cannot be arranged in the intermediate magazine 5 during the operation time of the specified long-term operation tool 7, are arranged in advance in the intermediate magazine 5 before the operation is commenced in the machining center 2.

In the case of the above-described embodiment, (N-N') tools 7 that cannot be arranged in the intermediate magazine 5 during operation of the long-term operation tools 7 having the operation time "A" will be arranged in advance in the intermediate magazine 5 in the stage before operation in the machining center 2 by adopting a part of the configuration of the before-operation embodiment.

However, although it is possible to optionally select whether the tools 7 to be arranged in the intermediate magazine 5 in advance are tools 7 operating prior to the N' tools 7 planned to be arranged in the intermediate magazine 5 during operation, tools 7 operating after the N' tools 7, or tools 7 operating in the interim, with respect to the position of arranging in advance in the intermediate magazine 5, it is necessary to specify the position of arranging the (N-N') tools 7 to be arranged before operation of the machining center 2 upon taking into consideration the sequence of operation between all the tools 7 requiring waiting time in response to the corresponding selection, so as to agree with the above-described sequence.

A detailed example regarding operation of the embodiment is as shown in the flowchart of FIG. 4. (N-N') tools 7 requiring waiting time are selected prior to operation of the machining center 2 and will be arranged at predetermined positions in the intermediate magazine 5.

In the embodiment, it is unavoidable to cause a partial time loss in that, with respect to (N-N') tools 7 requiring waiting time, the tools 7 are required to be arranged in the intermediate magazine 5 in the stage before operation in the machining center 2.

Taking such situations into consideration, such a configuration is available, in which it is adopted from the beginning that (N-N') tools 7 requiring waiting time, which cannot be arranged in the intermediate magazine 5 during operation of the machining center 2 are arranged in the intermediate magazine 5.

In detail, with respect to the tools 7 requiring waiting time, which are found in advance that the tools 7 cannot be arranged in the intermediate magazine 5 during the operation time of the specified long-term operation tool 7 wherein the number of tools 7 requiring waiting time that can be conveyed to the intermediate magazine 5 and can be arranged in the intermediate magazine 5 within the time in which a specified long-term operation tool 7 is operating is smaller than the number of tools 7 requiring waiting time, which are planned to be operated, from the time when the corresponding long-term operation tool 7 has operated to the time when the next long-term operation tool 7 is operated, such an embodiment may be adopted which is featured in that the tools have been transferred from the tool conveyance apparatus 3 to the tool replacement arm 4 during operation in the machining center 2.

A detailed example regarding operation of the embodiment is as shown in the flowchart of FIG. 5. (N-N') tools 7 requiring waiting time are transferred directly with respect to the tool replacement arm 4 only by conveyance of the tool conveyance apparatus 3 as in the tools 7 other than the tools 7 requiring waiting time. The embodiment has a technical advantage in that, in the stage before operation in the machining center 2, the time of arranging a part of the tools 7 requiring waiting time in the intermediate magazine 5 can be omitted.

EXAMPLE

Hereinafter, a description is given of an example.

Example

The example is featured in that, in all the processes, a part or all of tools 7 planned to operate with plurality of times (hereinafter simply called "tools 7 operating a plurality of times") are returned from the tool replacement arm 4 to the intermediate magazine 5 after being operated and ended in the machining center 2, and are arranged with the corresponding sequence of operation taken into consideration where the next operation is planned.

The operating situation of the above-described example is as shown in the flowchart in which carry-out of the tools 7 from the machining center 2 and separation thereof from the tool replacement arm 4 are taken into consideration as in FIG. 6.

As shown in the flowchart of FIG. 6, where the tools 7 operating with plurality of times are separated from the tool replacement arm 4 and are arranged to the intermediate magazine 5, the tools 7 are accepted between the tool replacement arm 4 and the intermediate magazine 5 only in the case where the corresponding arrangement is carried out after it is determined whether or not the tools 7 planned to operate next are arranged in the intermediate magazine 5.

However, where arranged as the tools 7 operating with plurality of times in the intermediate magazine 5, with respect to the tools 7 planned to operate next, it is not always certain that the timing for the tools 7 to transfer from the intermediate magazine 5 to the tool replacement arm 4 is coincident with the timing of causing the intermediate magazine 5 to accept the tools from the tool replacement arm 4 a plurality of times as described above as far as the corresponding arrangement is unavoidable with the subsequent operation timing and sequence taken into consideration.

Therefore, as shown in the flowchart of FIG. 6, when accepting tools 7 between the intermediate magazine 5 and the tool replacement arm 4, after the tools 7 planned to operate next are transferred from the intermediate magazine 5 to the tool replacement arm 4 at first, the tools 7 operating a plurality of times as described above are separated from the tool replacement arm 4 and are accepted by the intermediate magazine 5.

In any case, the above-described example is remarkably advantageous in that, with respect to the tools 7 operating with plurality of times, the reciprocation process of the tool conveyance apparatus 3 to the intermediate magazine 5 or to the tool replacement arm 4 can be omitted when carrying in and out the tools 7.

In addition, in the above-described example, if the tools 7 planned to operate with plurality of times are adopted regardless of whether they correspond to the tools 7 requiring waiting time or the long-term operating tools 7, excessive reciprocation in the tool conveyance apparatus 3 can be omitted.

EFFECTS OF THE INVENTION

Since, in the present invention based on the basic configuration, it is not necessary to store all the tools in the intermediate magazine, the intermediate magazine may be sufficient with a necessarily small capacity and space in comparison with the configuration in which all the tools are replaced via the intermediate magazine as in Patent Document 1, and further, replacement of tools, which is directly carried out by means of the tool conveyance apparatus and the tool replacement arm without the intermediate magazine, and replacement of tools, which is indirectly carried out by the intermediate magazine and the tool replacement arm, may be appropriately selected and adopted, wherein it is possible to prevent the waiting time from being occurrence or to decrease it as much as possible.

The present invention may be applicable in all the fields pertaining to production of machine tools that adopts a tool replacement system.

What is claimed is:

1. A tool replacement system including:
   a tool conveyance apparatus for holding tools and conveying the tools between a tool magazine storing a plurality of tools accommodated therein and a machining center in which tools are operated by rotation of a main spindle to perform a sequences of process operations;
   a tool replacement arm for accepting tools by rotational movement of the tool replacement arm and carrying the tools to the machining center, and taking out tools, whose operations have already ended, from the machining center;
   an intermediate magazine for accepting tools between the tool conveyance apparatus and the tool replacement arm; and
   a computer for controlling the system by providing sequences of the operations and operation times of tools operating in all the processes in advance of the sequences of process operations being carried out, and:
   controlling transfer of next ones of the tools of the sequences, planned to be operated next in the machining center after a specified one of the tools, for which specified one of the tools the operation time is shorter than a conveyance time by reciprocation of the tool conveyance apparatus between the tool magazine and the tool replacement arm, to the tool replacement arm by the tool conveyance apparatus,
   controlling conveyance of at least a part of the next ones of the tools, planned to be operated next in the machining center, for which a waiting time that is greater than or equal to the conveyance time by reciprocation of the tool conveyance apparatus between the tool magazine and the tool replacement arm occurs until the operation thereof in the machining center since the operation of the specified one of the tools already had ended, to the intermediate magazine in advance of the sequences of process operations being carried out, by an instruction of the computer in the machining center, and
   controlling, in the intermediate magazine, transfer of the corresponding tools requiring the waiting time in line by their sequence of operation, to the tool replacement arm via the intermediate magazine.

2. The tool replacement system according to claim 1, wherein when a tool requiring the waiting time is transferred from the intermediate magazine to the tool replacement arm, the computer controls that a tool whose operation has already ended in the machining center is separated from the tool replacement arm and is accepted by the intermediate magazine.

3. The tool replacement system according to claim 1, wherein the tools requiring the waiting time are arranged, in advance of the sequences of process operations being carried out, in the intermediate magazine by a sequence of procedure at a stage before commencing the operations in the machining center.

4. The tool replacement system according to claim 1, wherein after a tool operating for the first time is transferred from the tool conveyance apparatus to the tool replacement arm, a portion of the tools requiring the waiting time are arranged sequentially in the intermediate magazine in line by the sequence of operation by the tool conveyance apparatus at a stage in which a plurality of long-term operation tools thereafter operating sequentially, in a manner having operation times exceeding a total sum brought by adding the time in which the tool conveyance apparatus travels to reach the tool magazine from the tool replacement arm and further travels to the intermediate magazine, to the time of arranging the portion of the tools requiring the waiting time in the intermediate magazine, are operating.

5. The tool replacement system according to claim 4, wherein the number of tools requiring the waiting time that can be conveyed by the tool conveyance apparatus to the intermediate magazine and can be arranged in the intermediate magazine within the time in which a specified long-term operation tool is operating is smaller than the total number of the tools requiring the waiting time, which are planned to be operated, from the time when a corresponding one of the long-term operation tools has operated to the time when the next one of the long-term operation tools is operated, and the ones of the total number of tools requiring the waiting time, which are found in advance of the sequence of operations being carried out that cannot be arranged in the intermediate magazine during the operation time of the corresponding one of the long-term operation tools, are arranged, in advance of the sequence of operations being carried out, in the intermediate magazine before the operations are commenced in the machining center.

6. The tool replacement system according to claim 4, wherein the number of tools requiring the waiting time that can be conveyed by the tool conveyance apparatus to the intermediate magazine and can be arranged in the intermediate magazine within the time in which a specified long-term operation tool is operating is smaller than the total number of the tools requiring the waiting time, which are planned to be operated, from the time when a corresponding one of the long-term operation tools has operated to the time when the next one of the long-term operation tools is operated, and the ones of the total number of tools requiring the waiting time, which are found in advance of the sequence of operations being carried out that cannot be arranged in the intermediate magazine during the operation time of the corresponding one of the long-term operation tools, are transferred from the tool conveyance apparatus to the tool replacement arm during operation of the machining center.

7. The tool replacement system according to claim 1, wherein in all the sequences of process operations, at least a part of the tools planned to operate a plurality of times are returned from the tool replacement arm to the intermediate magazine after being operated in the machining center, and are arranged with a corresponding sequence of operation taken into consideration where the next operations of the tools to be operated a plurality of times is planned.

\* \* \* \* \*